Oct. 16, 1956     F. P. TAGLIAFERRI     2,766,680
AUTOMATIC TIMING DEVICE FOR DEEP FRYERS
Filed June 12, 1953     2 Sheets-Sheet 1

*INVENTOR.*
FRANK P. TAGLIAFERRI.
BY Howard J. Whelan
ATTORNEY

Oct. 16, 1956   F. P. TAGLIAFERRI   2,766,680
AUTOMATIC TIMING DEVICE FOR DEEP FRYERS
Filed June 12, 1953   2 Sheets-Sheet 2
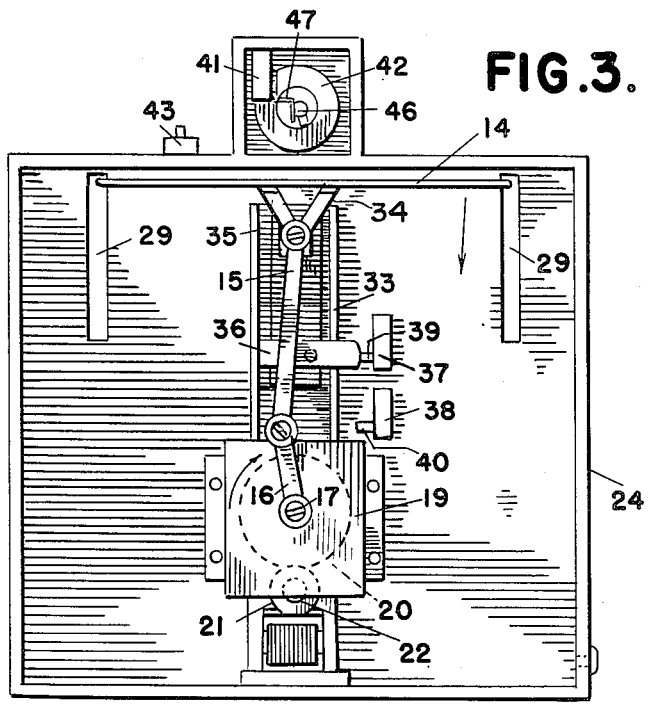
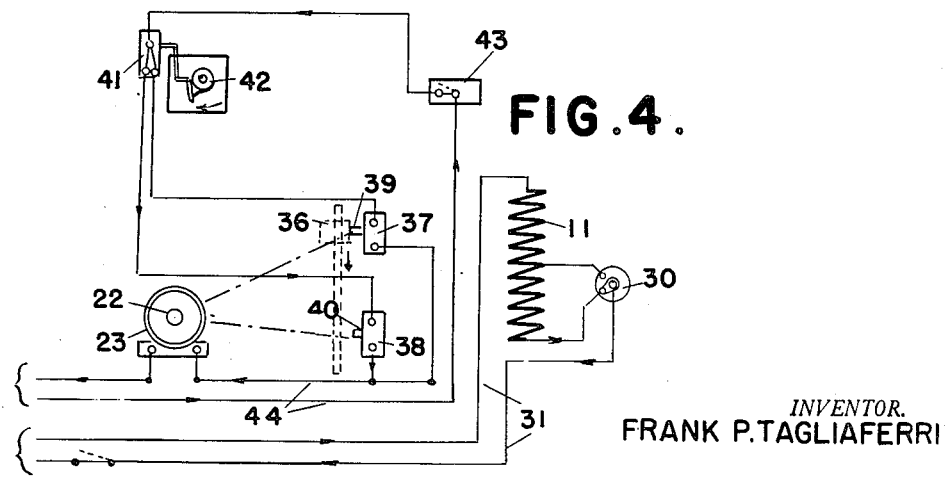
INVENTOR.
FRANK P. TAGLIAFERRI
BY *Howard J. Whelan*
ATTORNEY

United States Patent Office 2,766,680
Patented Oct. 16, 1956

2,766,680

AUTOMATIC TIMING DEVICE FOR DEEP FRYERS

Frank P. Tagliaferri, Baltimore, Md.

Application June 12, 1953, Serial No. 361,335

3 Claims. (Cl. 99—404)

This invention relates to cooking equipment and more particularly to the class known generally as deep fryers. It has among its objects to provide a new and improved deep fryer that can perform its work automatically and effectively, that will include simple mechanism in its construction, and have a structure with a motor for operating it under power.

In the particular form of deep fryer in which the medium of hot grease is employed to cook the article selected, the mechanism involved is comparatively complicated and has to be located with its operating parts separated from the heating means by a distance that will keep the latter from being burned or injured by the source of heat. This requires an expensive construction with the possibility of involved costs for maintenance. In this invention, the device is compact and can be used with a lifting and lowering mechanism made relatively short and placeable close to the heating means. It employs a motor for operating the mechanism which is not of the reversible type, yet permits the basket in which the cooking articles are heated, to be vertically reciprocated and automatically shut off and turned on, to suit the operations for which it is designed.

For a better understanding of the invention and the objects thereof, reference is made to the accompanying drawings, wherein a particular form of the invention is disclosed by way of example. The following description explains the construction, the method of operation and the principles on which it is based while the claims emphasize the scope of the invention.

Referring to the drawings:

Figure 3 is a rear view of Figure 1 with the back cover removed to show the interior construction, the wiring being omitted; and Figure 4 is a diagram of the wiring circuits employed in this embodiment.

Similar reference characters pertain to the same parts throughout the drawings.

Figure 1:
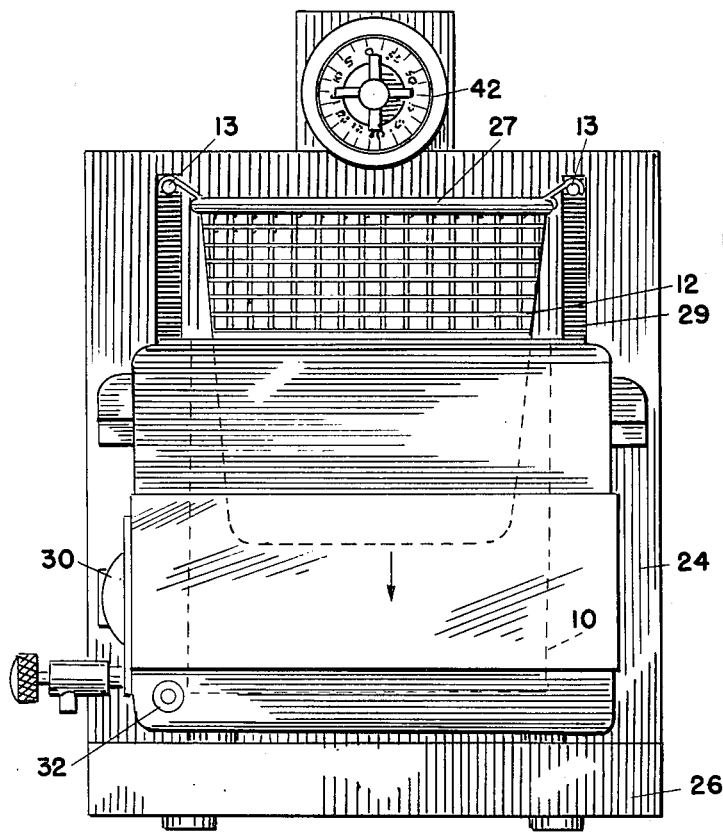
Figure 1 is a front elevation of a deep fryer embodying this invention.
Figure 2:
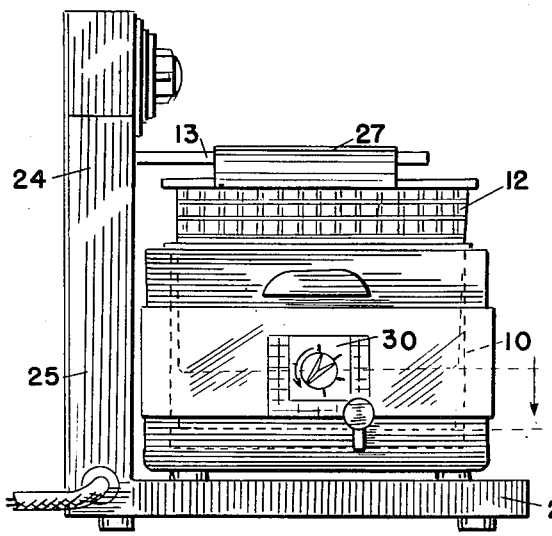
Figure 2 is a side elevation of Figure 1.

In the drawings, a deep fryer consists of a conventional frying pot structure 10 of selected depth, in which hot fat or grease is employed for the cooking of articles of food such as oysters. The pot is of a suitable material and design, insulated and heated by electricity using plural heating electrodes 11 incorporated within its structure, in a conventional manner. The pot 10 is relatively deep and receives a basket 12 of wire netting held aligned with it by lateral arms 13. The arms 13 are attached to a lifter bar 14, raised vertically to remove the basket from the pot and its grease, and lowered in the reverse direction when operated to place the basket into the pot and hold it there at the proper depth in the hot fat or grease until the cooking cycle is completed. The lifter bar 14 is reciprocated through the use of a connecting rod 15 actuated by a crank 16 rotated on a shaft 17 supported by bearings in a rectangular frame 19. The frame 19 is made relatively narrow as its mechanical operating parts consist of simple train of gearing 20 that is enclosable in a restricted space. This gearing 20 is of a conventional reducing nature and meshed with a power gear 21 mounted on the shaft 22 of an electrical motor 23. The motor 23 is of compact design to have it fit within the frame and placeable under the gearing 20. The housing 24 is L-shaped with its vertical wall component 25 made hollow to contain the operative lifting and control mechanism of the device. The lower portion or horizontal component of the housing is flat and forms a base 26 which serves to support the housing upright 25 and at the same time affords a surface on which to rest the pot structure 10, and is properly aligned with the basket 12 for cooking purposes.

The basket 12 is arranged with clips 27 fastened to its upper sides and which are alignable with the horizontal arms 13 that project beyond the face of the wall component 25 over the pot structure 10. These arms are attached to the lifter bar 14, slide in slots 29, and are raised and lowered with it, as the latter is reciprocated vertically. The pot structure may be readily removed or replaced on the base 26. It has a thermostat switch 30 in its heating circuit 31 and in series with its heating electrodes 11, for the temperature control of grease or the like used in the pot to cook the articles in question. The electrodes and circuit 31 are fed through conductors 32 from an outside service.

The mechanism for operating the lifter bar consists of the connecting rod 15 reciprocated in a vertical plane through the rotation of the crank 16 actuated by the train of gears 20 and 22 from the motor 23. A guide track 33 vertically mounted on the wall of the component 25 carries and guides a trunnion 34 within its curbed side pieces 35 designed to encompass it. The track 33 is in back of the connecting rod. The trunnion is connected to the lifter bar 14, so that the bar 14 and trunnion 34 travel together. Mounted on the face of the trunnion 34 is a tripper 36. The tripper extends laterally from the trunnion and is vertically travelling and comes in predetermined sequence with two single pole microswitches 37 and 38 respectively. The microswitches are spaced one above the other with their operating handles 39 and 40 respectively in the line of movement of the tripper 36 so as to be operated thereby. Another microswitch 41 of the three-way type is disposed close to a time clock device 42 to be actuated thereby in accordance with the settings the operator predeterminedly arranges for it. Another switch 43 is provided in the service line. The circuit 44 is tied in with these microswitches and the motor 23 to function according to the requirements of the deep fryer. This may be understood by referring to the wiring diagram shown in Figure 4 and the following details, arising in the operation of the invention.

The action of the heating circuit and thermostat in the pot structure 10 is conventional. The heat or current is turned on and through the use of the thermostat the temperature of the grease or mediums used in cooking is maintained continuously as long as needed, after its main switch 45 is turned on.

The circuit included in the basket control, for purposes of explanation, is assumed to have its basket out of the hot grease and in its uppermost position. While in this position, the lower switch 38 is "closed," and the upper switch 37 is "open." The latter is "open" because the tripper 36 is pressed against its handle 39 and opens it, while the handle 40 is released and the switch under the action of its spring is "closed." The three-way switch 41 is crossed ready to allow the current to go through to the switches 37 or 38 provided the latter are "closed" to allow the current to continue through them.

However to get the current through the switch 41, the clock 42 must be operated and at the end of the period of time selected, move its clock arm 46 over against the handle 47 of the switch 41 which opens or closes the circuit line coming from the service switch 43 to switches 37 and 38 alternately. When this happens the current in one instance continues through to the switch 38, to the motor 23 and operates it. The latter turns its shaft 17, gearing 20, 21, crank 16 and connecting rod 15 and brings the lifter bar 14 downwards from the position shown in Figure 1 to its lower position. This lowers the tripper simultaneously and eventually brings it against the switch handle 40 to open switch 38. When the tripper moved out of contact with switch 37 the latter returned to its normal closed position. When the switch 38 is opened, the circuit 41 to the motor is likewise opened and the motor 23 stops. The clock mechanism continues to function and after a predetermined period, closes the switch 37 and operates the motor 23. The motor through the incidental mechanism raises the lifter bar until the tripper 36 opens the switch 37 and stops the motor. The process is repeated as long as the deep fryer is in use.

The device is simple in construction, and may be adjusted to make the tripper suit the position of the switches 37 and 38. The motor is rotated in the same direction at all times, and avoids the difficulties and stresses incurred incident to those used reversibly. The cooking time is arranged to suit the use involved, and may be changed readily if desired or required. It is compact and neat in appearance, and has its mechanisms so arranged in a vertical position in the housing accessible without trouble, so that inspection and repairs may be made expeditiously and accurately.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. The combination with an L-shaped housing having a base, providing a support for a pot adapted for containing a heated frying medium, and a hollow vertical component extending upwardly from said base, of structure for immersing a basket and foodstuffs therein in such pot, maintaining such basket in the frying medium for a predetermined period of time and then lifting the basket clear of said medium; said structure being completely enclosed within the hollow vertical component and comprising a motor, timing mechanism for controlling the operation of said motor, a shaft, means connecting the motor to the shaft for causing the latter to be rotated by said motor, a crank rigid with said shaft, a connecting rod pivoted to said crank; said vertical component having a pair of parallel vertical slots in the front wall thereof; said structure also including a U-shaped lifter bar comprising a web, located behind said front wall, and a pair of arms extending from said web through said slots and adapted to form supports for removably holding the basket to be immersed in said medium, a pivot carried by said connecting rod, and means carried by said pivot and connecting the latter to said web at points spaced equal distances from the center of said web.

2. A structure of the type set forth in claim 1, in which the last mentioned means comprises a pair of members diverging from said pivot and forms a V-shaped connection for supporting said web.

3. A structure of the type set forth in claim 1, in which said timing mechanism includes a pair of switches adapted for controlling said motor and one overlying the other, and a tripper reciprocated vertically by the movement of said connecting rod for operating said switches.

References Cited in the file of this patent

UNITED STATES PATENTS

| | | |
|---|---|---|
| 2,196,968 | Bemis | Apr. 16, 1940 |
| 2,215,929 | Husk | Sept. 24, 1940 |
| 2,546,464 | Martin | Mar. 27, 1951 |